United States Patent
Sapozhnikov et al.

(10) Patent No.: US 10,992,551 B2
(45) Date of Patent: *Apr. 27, 2021

(54) SOFTWARE PROOF-OF-CONCEPT PLATFORM, INCLUDING SIMULATION OF PRODUCTION BEHAVIOR AND/OR DATA

(71) Applicant: PROOV SYSTEMS LTD., Herzliya (IL)

(72) Inventors: Alexey Sapozhnikov, Ramat Gan (IL); Toby Olshanetsky, Herzliya (IL); Israel Ben Tal, Petah Tikva (IL)

(73) Assignee: PROOV SYSTEMS LTD., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,393

(22) Filed: May 29, 2019

(65) Prior Publication Data
US 2019/0280947 A1    Sep. 12, 2019

Related U.S. Application Data

(63) Continuation of application No. 15/787,102, filed on Oct. 18, 2017, now Pat. No. 10,348,578.

(51) Int. Cl.
*G06F 9/44* (2018.01)
*H04L 12/24* (2006.01)
(Continued)

(52) U.S. Cl.
CPC ............ *H04L 41/5048* (2013.01); *G06F 8/20* (2013.01); *G06F 8/30* (2013.01); *G06F 8/60* (2013.01);
(Continued)

(58) Field of Classification Search
CPC ...... G06N 20/00; G06N 3/08; H04L 41/5045; H04L 41/5048; G06F 8/00; G06F 16/00;
(Continued)

(56) References Cited

U.S. PATENT DOCUMENTS

| 5,644,694 A | 7/1997 | Appleton |
| 5,729,669 A | 3/1998 | Appleton |

(Continued)

FOREIGN PATENT DOCUMENTS

| WO | 2008/134453 | 11/2008 |
| WO | 2008/134453 A1 | 11/2008 |

OTHER PUBLICATIONS

Application Layer Intrustion Detection, https://web.archive.org/web/20150907232721/https://www.owasp.org/index.php/ApplicationLayerIntrustionDetection, Sep. 7, 2015, pp. 1-2.

(Continued)

*Primary Examiner* — Tuan A Vu
(74) *Attorney, Agent, or Firm* — Browdy and Neimark, PLLC

(57) ABSTRACT

A system comprising a platform configured for communicating with enterprise end-users and for allowing the enterprise end-users to perform proof-of-concept testing for start-ups which provide respective enterprises with software products to be evaluated by the respective enterprises, the platform including processor functionality configured to analyze available information on enterprise data and, accordingly, generate metadata characterizing the enterprise data; generate artificial enterprise data conforming to the metadata; analyze available information on enterprise APIs and, accordingly, generate metadata characterizing the enterprise APIs; and generate at least one artificial API conforming to that metadata.

20 Claims, 8 Drawing Sheets

1. Upload an initial dataset, or upload or prompt enterprise end-user to upload or otherwise provide, to the main server, whatever information the current enterprise is making available regarding the actual enterprise data e.g. file based sources such as but not limited to some or all of CSV, WSDL, Swagger files, and/or a connection to some or all of the enterprise databases).
↓
2. Data analysis (aka extraction) by the main server on the uploaded information, to identify metadata according to which an artificial dataset is to be generated for the enterprise
↓
3. Dataset edit or editing/approval of metadata identified including providing a user interface to allow the customer aka enterprise end-user to correct results of operation 2 or add more data for analysis (in which latter case operation 2 may be repeated)
↓
4. Generate a new aka artificial dataset having the metadata approved in operation 3
↓
5. Deploy the artificial dataset in a POC environment

(51) Int. Cl.

| | |
|---|---|
| G06F 11/36 | (2006.01) |
| G06F 8/30 | (2018.01) |
| G06F 8/20 | (2018.01) |
| G06F 9/54 | (2006.01) |
| G06N 3/08 | (2006.01) |
| G06Q 10/06 | (2012.01) |
| G06F 16/16 | (2019.01) |
| G06F 16/25 | (2019.01) |
| G06F 8/71 | (2018.01) |
| G06F 8/60 | (2018.01) |
| G06F 8/41 | (2018.01) |

(52) U.S. Cl.
CPC ............. *G06F 8/71* (2013.01); *G06F 9/547* (2013.01); *G06F 11/3672* (2013.01); *G06F 16/164* (2019.01); *G06F 16/252* (2019.01); *G06N 3/08* (2013.01); *G06Q 10/06393* (2013.01); *G06Q 10/06395* (2013.01); *H04L 41/5045* (2013.01); *G06F 8/427* (2013.01)

(58) Field of Classification Search
CPC ..... G06F 8/20; G06F 8/30; G06F 8/60; G06F 8/71; G06F 16/252; G06F 11/3672; G06F 9/547; G06Q 10/06395; G06Q 10/06393
See application file for complete search history.

(56) References Cited

U.S. PATENT DOCUMENTS

| | | | |
|---|---|---|---|
| 7,509,626 | B1 | 3/2009 | Barnes et al. |
| 7,620,933 | B1 | 11/2009 | Appleton |
| 8,694,953 | B2 | 4/2014 | Khodabandehloo et al. |
| 9,329,915 | B1 | 5/2016 | Chandrasekharapuram et al. |
| 10,140,206 | B2 | 11/2018 | Sapozhnikov et al. |
| 10,348,578 | B2 | 7/2019 | Sapozhnikov et al. |
| 2002/0049749 | A1 | 4/2002 | Helgeson |
| 2004/0111428 | A1 | 6/2004 | Rajan et al. |
| 2008/0134281 | A1 | 6/2008 | Shinde et al. |
| 2010/0274800 | A1 | 10/2010 | Bogeby et al. |
| 2012/0266135 | A1 | 10/2012 | Mansour et al. |
| 2013/0288736 | A1 | 10/2013 | Laumen et al. |
| 2014/0324521 | A1 | 10/2014 | Mun |
| 2014/0365198 | A1 | 12/2014 | Kuell et al. |
| 2017/0061338 | A1 | 3/2017 | Mack |
| 2017/0139816 | A1 | 5/2017 | Sapozhnkov et al. |
| 2018/0053134 | A1 | 2/2018 | Olshanetsky et al. |
| 2019/0050321 | A1 | 2/2019 | Sapozhnikov et al. |
| 2019/0052549 | A1 | 2/2019 | Duggal |
| 2019/0114251 | A1 | 4/2019 | Sapozhnikov et al. |

OTHER PUBLICATIONS

Apache Commons Math, https://web.archive.org/web/20151029191131/http://commons.apache.org/proper/commons-math/userguide/stat.html, Oct. 29, 2015, p. 1-21.

Apache Drill, https://web.archive.org/web/20151023224344/http://drill.apache.org/, Oct. 23, 2015, pp. 1-2.

H2oai/sparkling-water, https://github.com/h2oai/sparkling-water, Aug. 10, 2015, pp. 1-4.

Apache Flink, https://en.wikipedia.org/w/index.php?title=Apache_Flink&oldid=685853621, Oct. 15, 2015, pp. 1-3.

Map Reduce, https://en.wikipedia.org/w/index.php?title=MapReduce&oldid=687813284, Oct. 25, 2015, pp. 1-6.

"Application Layer Intruston Dectection", available online at https://www.owasp.org/index.php/ApplicationLayerIntrustionDetection, downloaded Sep. 7, 2015.

"Apache Commons Math" available online at http://commons.apache.org/proper/commons-math/userguide/stat.html, downloaded Oct. 29, 2015.

"Apache Drill", available online at https://drill.apache.org/, downloaded Oct. 23, 2015.

"Sparkling Water provides H2) funcitionality inside Spark cluster" available online at https://github.com/h2oai/sparkling-water.git, downloaded Aug. 10, 2015.

"Apache Flink", available online at https://en.wikipedia.org/w/index.php?title=Apache_Flink&oldid=685853621, Oct. 15, 2015.

"MapReduce", available online at https://en.wikipedia.org/w/index.php?title=MapReduce&oldid=687813284, Oct. 25, 2015.

PCAP definition on Wikipedia (Mar. 2018): available online at https://en.wikipedia.org/w/index.php?title=Pcap&oldid=830802604.

What is PCAP? (Apr. 2018): available online at https://web.archive.org/web/20180415041237/http://www.tech-faq.com/pcap.html.

How to Monitor Machine Learning Models in Real-Time (Jan. 2019): available online at https://www.kdnuggets.com/2019/01/monitor-machine-learning-real-time.htML.

6 Supervised machine learning models on the given dataset (Oct. 2017): available online at https://www.kaggle.com/nirajvermafcb/comparing-various-ml-models-roc-curve-comparison.

Metrics to Evaluate Machine Learning Algorithms in Python (Aug. 2018): available online at https://web.archive.org/web/20180826095232/https://machinelearningmastery.com/metrics-evaluate-machine-learning-algorithms-python/.

Methods for saving and loading Keras Deep Learning Models (Jul. 2017): available online at https://web.archive.org/web/20170711040859/https://machinelearningmastery.com/save-load-keras-deep-learning-models/.

Training, validation, and test sets definition on Wikipedia (Dec. 2018): available online at https://en.wikipedia.org/w/index.php?title=Training,_validation,_and_test_sets&oldid=875589895.

Choosing the right estimator (Dec. 2018): available online at https://web.archive.org/web/20181231235826/https://scikit-learn.org/stable/tutorial/machine_learning_map/index.html.

Examples to available datasets websites: Data catalog (Apr. 2018): available online at https://web.archive.org/web/20180428055928/https://catalog.data.gov/dataset.

NYC open data (Jul. 2018): available online at https://web.archive.org/web/20180730220430/https://opendata.cityofnewyork.us/data/.

Kaggle datasets (Jul. 2018): available online at https://web.archive.org/web/20180730023626/http://www.kaggle.com/datasets.

A part of an example Python code snippet, operative to measure ROC AUC (Nov. 2018): available online at https://web.archive.org/web/20181130112834/https://raw.githubusercontent.com/jbrownlee/Datasets/master/pima-indians-diabetes.data.csv.

Song, Y., Zhang, L., & Giles, C. L. (2011). Automatic tag recommendation algorithms for social recommender systems. ACM Transactions on the Web (TWEB), 5(1), 4.

"N-gram", available online at https://en.wikipedia.org/wiki/N-gram, Mar. 1, 2020.

"Textgenrnn", available online at https://github.com/minimaxir/textgenrnn.

"Beginners guide to text generation using LSTMs" available online at https://www.kaggle.com/shivamb/beginners-guide-to-text-generation-using-lstms, 2019.

Available online at https://cs.stanford.edu/~zxie/textgen.pdf, Mar. 22, 2018: Xie, Z. (2017). Neural text generation: A practical guide. arXiv preprint arXiv:1711.09534.

Available online at https://www.ijstr.org/final-print/mar2017/A-Review-Of-Synthetic-Data-Generation-Methods-For-Privacy-Preserving-Data-Publishing.pdf.\- Mar. 3, 2017: Surendra, H., & Mohan, H. S. (2017). A review of synthetic data generation methods for privacy preserving data publishing. Int J Sci Technol Res, 6(3), 95-101.

Available online at https://www.aclweb.org/anthology/P18-1194/, Jul. 2018: Luo, B., Feng, Y., Wang, Z., Huang, S., Yan, R., & Zhao, D. (2018). Marrying up regular expressions with neural networks: A case study for spoken language understanding. arXiv preprint arXiv:1805.05588.

"Bag of Words", available online at https://en.wikipedia.org/wiki/Bag-of-words_model, Feb. 26, 2020.

"Machine Learning", available online at https://opennlp.apache.org/docs/1.9.1/manual/opennlp.html#opennlp.ml.maxent.

"Apache POI", available online at https://poi.apache.org/, Feb. 2020.

(56) References Cited

OTHER PUBLICATIONS

"Analyzing Sentence Structure", available online at https://www.nltk.org/book/ch08.html, Sep. 4, 2019.
"Sentence Detector", available online at https://opennlp.apache.org/docs/1.9.2/manual/opennlp.html#tools.sentdetect.
"English Tree Tagger . . . ", available online at https://www.sketchengine.eu/english-treetagger-pipeline-2/.
"KDnuggets", available online at https://www.kdnuggets.com/2015/01/text-analysis-101-document-classification.html, Jan. 2015.
"Proov", available online at https://proov.io, downloaded on Aug. 6, 2020.

Fig. 1a a. server learns interdependencies and/or trends and/or distributions of secret non-exposable customer (e.g. enterprise) data

↓ b. server creates data that fit interdependencies and trends/distribution as learned in operation a, typically generating data from zero rather than anonymizing the secret enterprise data, thereby to yield data that clones or is similar to or is representative of enterprise data

↓ c. Provide a user interface via which customers e.g. enterprises provide, for at least one enterprise API, a basic business logic expressed in supported formats e.g. WSDL, Swagger

↓ d. Optionally, the system provides a user interface via which customers e.g. enterprises, later upload additional business logic e.g. more rich behavior, e.g. via Java jars.

↓ e. Server uses enterprise input provided via the interface/s (typically including technical spec/s of enterprise's API's, in a predesignated format e.g. in REST or SOAP format), to generate, typically without coding, at least one API-simulating server with security components and APIs, which simulates the enterprise's API/s.

↓ go to Fig. 1b, operation f fig. 1b from Fig. 1a, operation 3
↓
f. data created in (b), and API's generated in (e), rather than the enterprise's non-exposable APIs, are used by the server to automatically create a lean (relative to the enterprise's legacy production environment) POC testing cloud environment (aka simulator or enterprise simulator) which is both representative of the (relatively large) legacy production environment of an Enterprise and filled with data.
↓
g. optionally, server recommends Business KPIs (Key Performance Indicators e.g. Cost, ROI of Sales, Efficiency) for measurement during a given POC, which are suitable to a particular POC trend thereby to provide decision making support for a non-expert at a domain tasked with judging how successful that given POC has been.
↓
h. server provides a connection to at least one startup and run POCs for at least one given software product provided by the at least one startup respectively, in the lean environment generated in operation f including provision of measured KPI's recommended in operation g, thereby to estimate the at least one given software product's capabilities in the enterprise's legacy production environment when the legacy environment is populated by the enterprise's secret non-exposable data
↓
i. server supports measurement or monitoring of Business KPIs (bKPIs) during the POC running on the simulator, based on plural datasources/data sets e.g. at least two of: customer API, customer Data sources, customer Log files – aka "complex" bKPIs

Fig. 2

1. Upload an initial dataset, or upload or prompt enterprise end-user to upload or otherwise provide, to the main server, whatever information the current enterprise is making available regarding the actual enterprise data e.g. file based sources such as but not limited to some or all of CSV, WSDL, Swagger files, and/or a connection to some or all of the enterprise databases).

↓

2. Data analysis (aka extraction) by the main server on the uploaded information, to identify metadata according to which an artificial dataset is to be generated for the enterprise

↓

3. Dataset edit or editing/approval of metadata identified including providing a user interface to allow the customer aka enterprise end-user to correct results of operation 2 or add more data for analysis (in which latter case operation 2 may be repeated)

↓

4. Generate a new aka artificial dataset having the metadata approved in operation 3

↓

5. Deploy the artificial dataset in a POC environment

Fig. 3

301. A user e.g. enterprise provides suitable input data from which enterprise API may be derived e.g. uploads a Swagger or WSDL file, and/or grants access to an RDBMS of the enterprise

↓

302. The system analyses the input data provided in operation 301 and accordingly, generates server code based on API definitions detected in the uploaded file or DB schema contents available by virtue of each server's access to the enterprise e.g. via RDBMS

↓

303. The server code generated in operation 302 may be wrapped in a suitable Deep Mirroring framework code and compiled

↓

304. The compiled API server code is then packaged in a suitable file format e.g. as a WAR (Web Application Resource or Web application ARchive) file

↓

305. A new virtual machine (e.g. Linux based virtual machine with preinstalled application server, is started for the Application server where the generated code is to be deployed

↓

306. The war file is deployed into the virtual machine. Typically, the war file is deployed/copied into the predefined directory managed by the application server. The application server, when started, typically constantly checks the directory and when the application server detects that a new file (the war file e.g.), is copied into the directory, the server, responsively, starts or trigger's the application's deployment into itself (into the application server).

↓

307. Access e.g. of a startup participating in an enterprise's pilot, and/or of the enterprise itself, to the running server code is granted via a suitable access channel provided by the system e.g. in co-pending USSN 15/347191.

Fig. 4

401. Provide an external resource (e.g. via URL or RDBMS credentials + SELECT command) e.g. in accordance with the method of Fig. 9

402. a container with wrapper code generated in operation 401 is deployed into a cloud environment of the platform shown and described herein. an AWS Lambda serviceor : Google Cloud Functions or Microsoft Azure Functions or IBM Blumix OpenWhisk Container may for example be used.

403. A test to validate the container code may be run e.g. to verify correctness of the uploaded code and/or to verify ability to use the uploaded code either as a business KPI or as part of a formula to compute a business KPI.

Fig. 5

2.1 understand data type. Typically, a tree of data types is provided, which may include parent and child data types . The above may be stored as a table of rules indicating, inter alia, which data type is a son/child of which.

2.2 Analyze data (typically, data is treated in columnar based representation).

2.3 Load the analysis results from operation 2.2 into a suitable database aka DeepMirroring database (model) , as a dataset.

Fig. 6

2.2.1 detect a data element type via metadata available from the provided data, if any.

↓

2.2.2 run NLP analysis flow (including linguistic data analysis, using internally compiled dictionaries) where applicable.

↓

2.2.3 run rules and related logic to understand the data by applying regular expressions and scripts defined for some rules, typically less than all rules. For example regular expressions and scripts may be defined for a Rule governing a URL field.

↓

2.2.4 As per every column in the initial data, run operations 2.2.1-2.2.3 and get weights as a result of every analysis phase, compute a rule e.g. the best fitting rule that can be detected. For example, a Simple Decision Tree that traverse these weights and selects the highest one may be employed, taking in account the importance of each weight relative to other weights.

Fig. 7

4.1 split originally uploaded dataset into numeric and textual portions e.g. as per dataset element aka entity

↓

4.2 generate the target dataset metadata.json e.g. a snapshot of the dataset to generate including rules and limitations

↓

4.3 run generation of numeric and textual portions typically in parallel

↓

4.4 join the numeric and textual portions generated in operation 4.3, into the original data representation

↓

4.5 if relationship limitations are provided by the customer aka enterprise, apply the relationship limitations to the joined data generated in operation 4.4

↓

4.6 typically, an archive of the generated data is prepared in advance for future download since size considerations may make downloading online upon user request impractical

Fig. 8

5.1 the target database is created and initiated

↓

5.2 generate business KPI candidates, as per the target pilot to which environment the dataset is being deployed.

↓

5.3 generate the target database structure based on the dataset metadata (aka dataset DDL generation)

↓

5.4 load the generated dataset into the target database generated in operation 5.1

↓

5.5 inform enterprise of dataset availability

Fig. 9

401.1 If a link to an external URL is provided the deep mirroring platform generates a wrapper code that is deployed into a container.

↓

401.2 If RDBMS credentials and SELECT command are provided a deep mirroring platform may be used to generate a wrapper code that is deployed into a container. Typically, provided credentials and SQL SELECT command are wrapped in the execution code and deployed into a container (e.g. AWS Lambda, Google Cloud Functions or Microsoft Azure Functions or IBM Blumix OpenWhis).

↓

401.3 If a Javascript or Python code operative to compute a KPI value is uploaded into the platform shown and described herein, that code may be wrapped in SQL executing code and deployed into a container.

SOFTWARE PROOF-OF-CONCEPT PLATFORM, INCLUDING SIMULATION OF PRODUCTION BEHAVIOR AND/OR DATA

REFERENCE TO CO-PENDING APPLICATIONS

None.

FIELD OF THIS DISCLOSURE

The present invention relates generally to software and more particularly to proof-of-concept (pilot) testing of software.

BACKGROUND FOR THIS DISCLOSURE

US2017139816 (A1) describes an end-to-end "pilot as a service" system for controlling start-up/enterprise interactions.

U.S. Pat. No. 7,509,626 describes a method for demonstrating proof of concept of a project with requirements component providing weights on importance and tracking with use cases.

U.S. Pat. No. 9,329,915 describes a system and method for testing in a production environment.

US2014365198 (A1) describes techniques to simulate production events.

US2004111428 (A1) describes a toolset for applying object-oriented models to multi-tiered enterprise applications.

WO2008134453 (A1) describes a system and method for creating an assurance system in a production environment.

U.S. Pat. No. 8,694,953 (B2) describes a tool and methodology for enterprise software applications.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide processor circuitry configured to generate data that is similar to an enterprise's data although it is not a replica of the enterprise's data. Typically a main server is operative to learn inter-dependencies and/or trends and/or distribution of customer data and to create dummy aka artificial data that complies with the inter-dependencies and/or trends and/or distribution, rather than anonymizing or whitening the enterprise's secret data.

Certain embodiments of the present invention seek to provide processor circuitry configured for generation of APIs without coding by human engineers, and instead, the APIs are typically fully based on basic business logic provided via formats such as but not limited to WSDL. Swagger, or enterprise Data. Enterprises may later upload more rich behavior e.g. via Java jars.

The data and APIs may be used as or in a small but representative-of-enterprise POC (aka pilot) testing cloud environment which simulates a legacy production environment of enterprises which may be larger and may be filled by secret not-exposable data. Generally, an enterprise production ("prod") environment, for a computerized enterprise which performs software tasks in its day-to-day operations, includes networked servers configured by software and networked computer data repositories storing computer data accessible to the servers, and, typically, one or more APIs via whose aspects or portions of the software and/or data are accessible to computers external to the enterprise. The servers and associated repositories are used by the enterprise to perform its day-to-day operations.

Certain embodiments of the present invention seek to provide processor circuitry configured to measure business KPIs per POC trend e.g. when in the above small environment. The enterprise may for example measure cost, ROI of sales and/or efficiency and/or other key system performance indicators during a POC. According to certain embodiments, complex business KPIs, based on plural data sources such as but not limited to some or all of: customers API, customers Data sources, customers Log files, may be measured. According to certain embodiments, business KPIs may be provided that are suited to a specific POC trend, providing useful decision support for non-experts, based on automatic learning of enterprise data trends and/or based on enterprise-designated trends.

Certain embodiments of the present invention seek to provide a platform allowing enterprise end-users to efficiently perform proof-of-concept testing for startups providing software products to be evaluated by the enterprise. Typically, the platform includes processor functionality configured to analyze available information on enterprise data thereby to generate metadata characterizing the enterprise data and then generating artificial enterprise data conforming to that metadata. Alternatively, or in addition, the platform includes processor functionality configured to analyze available information on enterprise APPs thereby to generate metadata characterizing the enterprise API's and then generating at least one artificial API conforming to that metadata. Alternatively or in addition, the platform includes processor functionality configured to provide business KPIs which provide computerized decision support for the enterprise e.g. in seeking to evaluate software product/s pursuant to proof-of-concept (POC) thereupon, or compare plural such products for each of which proof-of-concept testing was performed.

Certain embodiments of the present invention seek to provide a system for simulating each of plural enterprises' respective production environments and/or data repositories and/or API's. The system may serve a platform for running software proof-of-concept tests (=pilots which test startup software, aka POCs). This platform, e.g. when served by the system for simulating, allows the enterprises to propose POCs and allows startups to bid responsive to each such proposal, including running their software on simulated production environments and data repositories provided by the system, via APIs provided by the system.

Certain embodiments of the present invention seek to provide a system and method for learning an enterprise's production environment including some or all of servers, software, data, and APIs to software outside the environment, and generating an environment similar to the enterprise's production environment including some or all of servers, software, data, and APIs which are respectively similar to the enterprise's production environment's servers, software, data, and APIs respectively.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented, as appropriate.

The present invention typically includes at least the following embodiments:

Embodiment 1

A system comprising:
a platform configured for communicating with enterprise end-users and for allowing the enterprise end-users to perform proof-of-concept testing for startups which provide respective enterprises with software products to be evaluated by the respective enterprises, the platform including processor functionality configured to:
  analyze available information on enterprise data and, accordingly, generate metadata characterizing the enterprise data;
  generate artificial enterprise data conforming to the metadata;
  analyze available information on enterprise APIs and, accordingly, generate metadata characterizing the enterprise APIs; and generate at least one artificial API conforming to that metadata.

Embodiment 2

A method for communicating with enterprise end-users and for allowing the enterprise end-users to perform proof-of-concept testing for startups which provide respective enterprises with software products to be evaluated by the respective enterprises, the method comprising:
providing a platform including processor circuitry configured to:
  analyze available information on enterprise data in an enterprise's production environment and, accordingly, generate metadata characterizing the enterprise data;
  automatically generate artificial enterprise data aka "regenerated simulated dataset", conforming to the metadata;
  analyze available information on enterprise APIs in an enterprise's production environment and, accordingly, generate metadata characterizing the enterprise APIs;
  automatically generate at least one artificial API aka "regenerated simulated smart API", conforming to that metadata; and
providing to at least one enterprise, access via a channel to a pilot environment aka POC testing cloud environment including the regenerated simulated dataset and the regenerated simulated smart API, thereby to provide a POC testing cloud environment which is leaner than the enterprise's production environment, but is representative thereof.

Embodiment 3

A method according to any of the preceding embodiments and wherein at least one enterprise provides input data from which an enterprise API is regenerated, aka derived.

Embodiment 4

A method according to any of the preceding embodiments wherein the input data has Swagger file format.
A conventional Swagger parser may be employed; the extraction task e.g. as shown and described herein then analyzes the resulting parsing tree, typically, only GET methods are treated.

Embodiment 5

A method according to any of the preceding embodiments wherein the input data has WSDL file format.

Open source libraries may be used to parse the WSDL file an d subsequently analyze the resulting parse tree, typically, only GET methods are treated.

Embodiment 6

A method according to any of the preceding embodiments wherein the input data is provided by granting the platform access to an RDBMS of the enterprise.

Embodiment 7

A method according to any of the preceding embodiments wherein the processor circuitry is configured to analyze the input data and derive API definitions characterizing an API, and, accordingly, to automatically generate server code based at least partly on the API definitions.
Open source and conventional libraries may be used for Swagger/WSDL based code generation.
Typically, a framework code is generated and subsequently repeatedly re-used, which provides basic/common functionality for plural generated codes typically including all system layers commonly used in the industry e.g. some or typically all of data access layer, business logic layer, error and validation handling libraries.

Embodiment 8

A method according to any of the preceding embodiments wherein the server code is wrapped in a framework code.

Embodiment 9

A method according to any of the preceding embodiments and also comprising generating KPIs for at least one enterprise.

Embodiment 10

A method according to any of the preceding embodiments which generates a wrapper code that is deployed into a container thereby to provide containerized code, using RDBMS credentials and a SELECT command provided to the platform.

Embodiment 11

A method according to any of the preceding embodiments wherein code operative to compute a KPI value is uploaded into the platform and is wrapped in SQL executing code and deployed into a container thereby to provide containerized code.

Embodiment 12

A method according to any of the preceding embodiments wherein the containerized code returns a numeric value which is used as a business KPI including measurement of the business KPI during a pilot run by the enterprise.

Embodiment 13

A method according to any of the preceding embodiments wherein the containerized code returns a numeric value which is used as a variable in a business KPI formula with plural variables, thereby to yield a complex business KPI which is measured during a pilot run by the enterprise.

Embodiment 14

A method according to any of the preceding embodiments wherein the plural variables are provided by plural data sources.

Embodiment 15

A method according to any of the preceding embodiments wherein the plural data sources include at least two of: enterprise (aka customer) API, customer Data source, customer Log files.

Embodiment 16

A method according to any of the preceding embodiments wherein at least one Business KPI is based on automatic learning of enterprise data trends.

For example, it may be desired to measure an access to external API, for example, a Salesforce.com API. The system herein may track (e.g. collected via the platform channels) metrics for a specific measurement time period such as some or all of: the number of Salesforce API calls, their payload size, and the number of users registered thereto.

Embodiment 17

A computer program product, comprising a non-transitory tangible computer readable medium having computer readable program code embodied therein, the computer readable program code adapted to be executed to implement a method for communicating with enterprise end-users and for allowing the enterprise end-users to perform proof-of-concept testing for startups which provide respective enterprises with software products to be evaluated by the respective enterprises, the method comprising:
providing a platform which includes processor circuitry configured to:
analyze available information on enterprise data in an enterprise's production environment and, accordingly, generate metadata characterizing the enterprise data;
automatically generate artificial enterprise data aka "regenerated simulated dataset", conforming to the metadata;
analyze available information on enterprise APIs in an enterprise's production environment and, accordingly, generate metadata characterizing the enterprise APIs;
automatically generate at least one artificial API aka "regenerated simulated smart API", conforming to that metadata; and
providing to at least one enterprise, access via a channel to a pilot environment aka POC testing cloud environment including the regenerated simulated dataset and the regenerated simulated smart API, thereby to provide a POC testing cloud environment which is leaner than the enterprise's production environment but is representative thereof.

Embodiment 18

A method according to any of the preceding embodiments wherein the containerized code returns a numeric value which is used as a business KPI including measurement of the business KPI during a pilot run by the enterprise.

Embodiment 19

A method according to any of the preceding embodiments wherein the containerized code returns a numeric value which is used as a variable in a business KPI formula with plural variables, thereby to yield a complex business KPI which is measured during a pilot run by the enterprise.

Also provided, excluding signals, is a computer program comprising computer program code means for performing any of the methods shown and described herein when said program is run on at least one computer; and a computer program product, comprising a typically non-transitory computer-usable or-readable medium e.g. non-transitory computer-usable or-readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or a combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in the singular form is not intended to be limiting; thus the term processor is intended to include a plurality of processing units which may be distributed or remote, the term server is intended to include plural, typically interconnected modules, running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings; all flowchart illustrations are for methods which may comprise any subset of or all of the illustrated operations, suitably ordered e.g. as shown:

FIGS. 1a and 1b, taken together, form a simplified flowchart illustration of a method for automatic dataset and API generation, serving a population of enterprises running pilots and measuring business KPIs to quantify successfulness of each startup participating in each pilot.

FIG. 2 is a simplified flowchart illustration of a method for artificially generating datasets for enterprises where each dataset simulates an enterprise's actual dataset which is at least partly secret or inaccessible or insufficient; the operations shown may be performed for each enterprise dataset to be simulated;

FIGS. 3-5 are simplified flowchart illustrations of methods according to certain embodiments of the invention;

FIG. 6 is a simplified flowchart of an example method for performing operation 2.2. of FIG. 5;

FIG. 7 is a simplified flowchart illustration of an example method for performing the operation 4 of FIG. 2; the method may also be used standalone rather than in conjunction with the remaining operations of FIG. 2;

FIG. 8 is a simplified flowchart illustration of an example method for performing operation 5 of FIG. 2; and FIG. 9 is a simplified flowchart illustration of a method according to certain embodiments of the invention.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include an apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Certain embodiments include a system and method serving a population of enterprises, including, for each enterprise in a set of enterprises, running a POC for at least one software product provided by at least one respective start-up, wherein running the POC includes estimating the at least one software product's capabilities in a legacy production environment of an Enterprise which is populated by the enterprise's secret non-exposable data, the enterprise having non-exposable APIs.

Any suitable architecture may be employed. For example, some or all of the following system components may be provided:

a. API server which may serve as an entrance module to a platform aka Deep Mirroring (DM) platform e.g. to perform mirroring operations described herein.

b. Orchestrator module operative for on-demand generation and execution of flows e.g. some or all flows described below with reference to FIGS. 1-9;

c. "DM tasks" modularized elements that are combined suitably to provide workflows such as extraction and/or generation and/or deployment flows described below, that may run on a distributed platform/framework.

d. General storage for data e. Centralized storage for dataset metadata f. Messaging infrastructure for asynchronous execution of different system elements what communicates with each other via messages. For example, when starting or completing a workflow corresponding messages may be sent from one functional module (e.g. in the server or platform) to another to inform about overall process advancement.

Data generation related user interaction with the system via a UI is performed via the API server. All processing workflows are typically initiated by the user.

The system typically provides some or all of the following three main workflows: extraction, generation, and/or deployment.

Extraction workflow may include a single extraction task that utilizes logic, rules and algorithms responsive for semantic understanding of data including learning trends and patterns therewithin e.g. as described below.

Typically, POS (parts of speech) are used in the extraction phase (aka workflow) and/or in the below deployment workflow's KPI candidates task to detect possible KPIs that enterprise user may wish to add to the specific pilot's KPIs measuring.

To identify pos, any open source POS tagger may be used, e.g. StanfordNLP, Apache OpenNLP, NLTK. Typically, only nouns are treated, and verbs, adjectives or other parts of speech are deemed not of interest.

Generation workflow may include any subset of and typically all of the following list of dependent tasks which are typically performed in the following order:

1. Split task—generates enterprise provided dataset metadata (metadata snapshot) that includes all enterprise user data rules, attributes, limitations and relationships. Also this task based on the metadata splits the enterprise user provided data into textual and numeric data.
2. Generation task—uses the metadata and split data from the previous "split" task and runs generation process to generate textual and/or numeric data
3. Join task—combines textual and/or numeric data that are output of the previous "generation" task, into a dataset that resembles the original data provided by the enterprise user.
4. Relationship task—reads the dataset metadata (generated by the split task) and impose the relationship related changes on the data that is outputted by the join task.

5. Gzip task—creating the final downloadable artifact (an archive file/s) containing the generated data.

Any suitable technology may be used to generate a relationship, in a data structure in accordance with embodiments of the present invention, between plural files received from a certain enterprise such as, say, file1—the enterprise's customer-file and file2—inventory-file listing various products distributed by the enterprise. for example, a relationship may be generated between 2 tables by reading dataset metadata generated by the split task and extracting tuples of fields on both sides of the relationship. if a relationship contains 2 fields in each table, this yields 2 tuples with cardinality specified on the relationship. Based on these tuples an equation system may be generated and then solved e.g. by applying a Gaussian algorithm after first to finding linear combinations in those tuples. The Reuche-Capelli theorem, for example, may be used to search for all possible solutions of the equation system, of which, if plural, one solution is selected e.g. the first one. If no solution is found, the contradicting records may be identified and a report generated report explaining why the relationship cannot be generated.

Deployment workflow may include any subset and typically all of the following list of dependent tasks typically performed in the following order:
1. KPI (Key Performance Indicator) candidates task—takes metadata e.g. as described herein, which is typically pilot (POC)-specific, and searches, in the generated dataset, for potential KPI candidates that may be measured and of interest to the enterprise user.
2. DB scripts task—generates database SQL scripts which may be supported by the platform RDBMSs.

Deployment task—runs SQL scripts generated in the previous "DB scripts" task against the provided database instance, then it runs vendor specific tools to import the generated dataset. For example, in case of MySQL mysqlimport, may be used for PostgreSQL, gsql.

API generation flow may include any subset of and typically all of the following six dependent tasks which are typically performed in the following order:
1. Upload task—An enterprise user uploads a Swagger/WSDL specification file or provides connection parameters to an RDBMS.
2. Code generation task—Deep mirroring platform generates the server-side code based on parameters provided by the upload task.
3. Code modification task—the generated code is modified/enriched by the system
4. Deployable code creation task—the enriched code is compiled, checked and a deployable artifact is created.
5. Server instance creation task—a server or virtual machine is created on which the previously generated code may be deployed. The relevant application server is installed and configured on this server.
6. Server deployment task—the generated deployable artifact is deployed on the previously created server/virtual machine.

FIGS. 1a and 1b, taken together, form a simplified flowchart illustration of a method for automatic dataset and API generation, serving a population of enterprises running pilots and measuring business KPIs to quantify successfulness of each startup participating in each pilot. References to a "server" are intended to include several interconnected modules which may run on plural physical servers. The method of FIGS. 1a-1b typically includes some or all of the following operations, suitably ordered, e.g. as follows:

Operation a. Server learns interdependencies and/or trends and/or distributions of secret non-exposable customer (e.g. enterprise) data Operation b. Server creates data that fit interdependencies and trends/distribution as learned in operation a, typically generating data from zero rather than anonymizing the secret enterprise data, thereby to yield data that clones or is similar to or is representative of enterprise data Operation c. Provide a user interface via which customers e.g. enterprises provide, for at least one enterprise API, a basic business logic expressed in supported formats e.g. WSDL, Swagger Operation d. Optionally, the system provides a user interface via which customers e.g. enterprises, later upload additional business logic e.g. more rich behavior, e.g. via Java jars.

Operation e. Server uses enterprise input provided via the interface/s (typically including technical spec/s of enterprise's API's, in a predesignated format e.g. in REST or SOAP format), to generate, typically without coding, at least one API-simulating server with security components and APIs, which simulates the enterprise's API/s. It is appreciated that for an enterprise to run a POC for a given software product e.g. computer program, an intricate integration process between the software product and the enterprise's environment or ecosystem (or a simulation thereof) generally is performed. If the enterprise has an API, this simplifies integration e.g. by reducing the enterprise's exposure to potential security threats (e.g. to its data or software).

Operation f. Data created in (b), and API's generated in (e), rather than the enterprise's non-exposable APIs, are used by the server to automatically create a lean (relative to the enterprise's legacy production environment) POC testing cloud environment (aka simulator or enterprise simulator) which is both representative of the (relatively large) legacy production environment of an enterprise and filled with data.

Operation g. Optionally, server recommends business KPIs (Key Performance Indicators e.g. Cost, ROI of Sales, Efficiency) for measurement during a given POC, which are suitable to a particular POC trend thereby to provide decision making support for a non-expert at a domain tasked with judging how successful that given POC has been.

Operation h. Server provides a connection to at least one startup and run POCs for at least one given software product provided by the at least one startup respectively, in the lean environment generated in operation f including provision of measured KPI's recommended in operation g, thereby to estimate the at least one given software product's capabilities in the enterprise's legacy production environment when the legacy environment is populated by the enterprise's secret non-exposable data Operation i. Server supports measurement or monitoring of business KPIs (bKPIs) during the POC running on the simulator, based on plural data sources/data sets e.g. at least two of: customer API, customer data sources, customer Log files—aka "complex" bKPIs The method of FIG. 2 typically includes some or all of the following operations, suitably ordered, e.g. as follows:

Operation 1. Upload an initial dataset, or upload or prompt enterprise end-user to upload or otherwise provide, to the main server, whatever information the current enterprise is making available regarding the actual enterprise data e.g. file based sources such as but not limited to some or all of CSV, WSDL, Swagger files, and/or a connection to some or all of the enterprise databases).

Any suitable process may be employed to upload in each of the use-cases (e.g. DB access option described herein, CSV, SWAGGER, SOAP). For example, to upload WSDL/Swagger, an enterprise user of the system may for example provide a URL of the file or drag-and-drop the file from his/her PC in a suitable user interface provided by the platform, aka "the Deep mirroring UI". If it is desired to provide a connection to some or all of the enterprise databases, the enterprise user may provide some or all of: IP/hostname, port, username password, database/schema name and may select a target database type, for example MySQL, PostgreSQL, Oracle, SQL Server, etc.

Operation 2. Data analysis (aka extraction) by the main server on the uploaded information, to identify metadata according to which an artificial dataset is to be generated for the enterprise Operation 3. Dataset edit or editing/approval of metadata identified including providing a user interface to allow the customer aka enterprise end-user to correct results of operation 2 or add more data for analysis (in which latter case operation 2 may be repeated)

Operation 4. Generate a new aka artificial dataset having the metadata approved in operation 3

Operation 5. Deploy the artificial dataset in a POC environment A detailed description is now provided of a method for dataset generation, for a given enterprise from among a population of enterprises, and typically for a given purpose e.g. testing by that enterprise of a given proof-of-concept. This may include some or all of the operations of FIG. 2 and may include some or all of the following operations performed by a main server:

Operation 1. Upload an initial dataset or file based source/s and/or connection/s to an any or all of an enterprise's actual data repository aka database aka DB. Any or all of the following file based sources may be provided by the enterprise: one or more CSV data sources or files and/or one or more WSDL data sources (or other xml-formatted file, or SOAP file e.g. in SOAP 1.1 format or SOAP 1.2 format or any other format supported by the main server) and/or one or more Swagger files (or other JSON or YAML formatted file). Alternatively or in addition, there may be provided a connection to the enterprise's actual data repository aka database, aka DB).

For example, a data set may include one or more databases or Excel files, each exported in CSV format or WSDL format.

From these one or several data sources which may be provided by each of many enterprises, the main server automatically learns what dataset each enterprise seeks to generate e.g. by learning meta-data which characterizes the enterprise's actual dataset.

The information or data source/s provided by each enterprise may vary widely. One enterprise end-user may use the user interface provided by the main server to give the main server access to the enterprise's data repository in which only empty tables are present (e.g. by erasing the contents of all tables), allowing the data structure to be learned but not allowing any actual data to be collected. Or, the enterprise's data repository may include at least some non-empty tables, enabling actual data to be analyzed in operation 2 below. Typically, the main server discerns automatically whether tables are full or empty.

If the enterprise seeks to provide a connection to the enterprise's actual data repository, typically the enterprise is prompted by the main server to provide, to the main server, the IP address of the enterprise's server, as well as the port, username and passport assigned by the enterprise server to the main server shown and described herein. The main server shown and described herein then typically accesses the enterprise's tables including metadata/relationships between the tables and including content of any of the tables (which may or may not be empty). For example, if the enterprise's tables include a table of users and an addresses tables storing each user's one or more addresses, the relationship between these two tables is typically also accessed by the main server shown and described herein.

Typically, if the enterprise uploads one or more CSV files (say), which are in compliance with predefined requirements, formats being based on the relevant specifications e.g. WSDL version 1.1 or 2.0; the Swagger OpenAPI version 2.0 specification; or CSV in which data is comma-separated on a row basis.

The main server typically determines whether or not the columns of uploaded files have headers. If not, the main server typically automatically generates headers by deducing a common denominator between the various entries in each column. Known functionality may be used e.g. as in Apache Spark SQL or Apache Flink SQL.

Typically, each time a dataset is uploaded by an enterprise, the main server defines at least one task (e.g. as described above in connection with the extraction, generation, deployment workflows, according to which processing by the main server then occurs).

Typically the flow is generic for all types of data sources, whether CSV, WSDL, Swagger, or others.

The main server may be pre-configured to support any desired versions of each data source type e.g. version 2.0 or other of Swagger, version 1.1 or 2.0 or other of WSDL, etc.

Typically, e.g. if the dataset or any part thereof includes only headers (e.g. such as "first name", "social security number", etc.) without data entries below the headers, NLP (natural language processing) is used to deduce the natural language meaning of the headers e.g. by any conventional text processing or semantic processing. Alternatively or in addition, data entries below headers may be used to "understand" the headers e.g. by deducing a common denominator between the various entries in each column or descriptor which fits all or most such entries. For example, a column with entries such as "John", "Joe" or "Mary" may be assigned a "first name" header.

Typically, a dataset is generated which fills a given table with known (e.g. learned) structure with dummy data, which conforms to various rules. For example, one rule might be that a certain ("dummy") dataset being generated for enterprise A should include 100,000 "dummy" transactions including 10 transactions per customer in the enterprise's customer table. Or, the ("dummy") dataset being generated for enterprise B should include 40% male entries and 60% female entries (e.g. enterprise customers who are men as opposed to women). Another rule may be the total number of data entries or rows to be generated. Another rule may for example be, that if persons' genders are known, then names for male persons should be drawn from a repository of male names, such as John or Robert, whereas names for female persons might be randomly sampled from a repository of female names, such as Joy or Roberta.

Typically, rules according to which data is generated, are stored in a rule repository and are selected by a user e.g. enterprise. If rules do not contradict each other and do not contradict data limitations provided by the user, the system generates the data as described herein.

Typically, contradictions between rules are identified e.g. using automated logic, and, if present, the relative importance of the various rules may be quantified using any suitable prioritization scheme e.g. a decision tree such as a Simple Decision Tree having rule-based weights. Typically, less important rules are avoided to enable the dataset to be generated in accordance with only the most or more important rule/s, e.g. if (taking examples discussed herein) it is not possible to generate a predetermined number N of data entries of which 40% are male, 60% are female, and each male is associated with 10 inventory products, whereas each female is associated with 100 products. Typically, the rule setting the total number of data entries or rows to be generated, takes precedence over other rules.

According to certain embodiments, rule attributes may be imposed by an enterprise user on a specific data field to which a specific rule is assigned. For example, a "Keep ratio" attribute may be imposed by user A on data field B.

The "Keep ratio" attribute may be used if for example in the data provided by the enterprise user we have 100 records out of which 60%/o are females and 40% males in the 'gender' field, and the system is asked to generate 10000 persons. If the enterprise user selected this optional attribute, the system would then be constrained to generate 6000 records with female gender, and 4000 with male gender.

Or, a "mask data flags" attribute may be imposed by user A on data field C (or B). Masking data means that the system is constrained to ignore the original data for generation, but not for extraction. For example, given an email rule based table column which contains real corporate emails and given that the enterprise user selects to mask the column (e.g. by selecting the mask data flags attribute)—the server is then constrained to the existing values and instead, to generate other email addresses, typically applying other dependencies (e.g. first name and last name, but for a different internet domain), where possible.

In general, any rules such as but not limited to rules which facilitate semantic understanding of data such as deducing that a particular table's field stores first names or last names, are shown and described herein merely by way of example and are not intended to be limiting. Each such rule may be augmented or replaced by any other suitable rule/s.

Operation 2. Data analysis (aka extraction or meta-data extraction) flow. The input may include any of the information uploaded in operation 1 such as but not limited to an original dataset, some (e.g. passwords, names, contact information) or all of whose contents which may be masked e.g. using conventional masking or anonymizing or whitening technologies to replace some or all fields. Any suitable analysis may be provided, such as for example natural language processing of the names of each field in each table and/or learning relationships between tables and/or cluster analysis of table contents if provided and/or identifying data types such as text, number, etc. (which may be available e.g. in WSDL). Typically the output includes a dataset definition e.g. metadata defining the dataset to be generated, which may comprise all types of data identified, and/or relationships that were identified between data tables. For example, data tables may include some or all of an enterprise's customers and/or products and/or warehouse inventory and/or orders and/or invoices. Relationships may indicate that customer x in the customers' table purchased products y and z in the products' table, or that product z is stored at location x in the warehouse inventory table or was invoiced in invoice I in the invoices' table which was sent to a certain customer in the customers' table.

It is appreciated that operations herein may be omitted, as appropriate. For example, the main server shown and described herein may, for a given enterprise, be given authorization to connect to the enterprise's database to discern the database's structure e.g. the semantic meaning of each field in each table in the database, however, the main server may not be given authorization to actually access the enterprise's data which resides in those tables, or vice versa. In the first instance, the above operation 1 is performed, but not operation 2. In the second instance, vice versa, operation 2 may be performed, and not operation 1. Or, the main server shown and described herein may, for a given enterprise, be given authorization to connect to the enterprise's database and to access the enterprise's data, in which case operations 1 and 2 may both be performed.

Operation 3. Dataset edit and approval—end user uses user interface provided by the main server to edit the dataset definition. The user interface allows the customer e.g. the enterprise's dataset designer, to view results of at least operation 2 (e.g. column x in table y was identified to be email addresses) so s/he sees how the enterprise's data was understood by the main server and:

correct if and as appropriate—and/or add more data for analysis and initiate repetition of operation 2 (data analysis) by the server.

For example, the human designer of enterprise.com may see that the organization's email addresses appear in the learned dataset. The designer may decide to replace all email addresses of the form xx@enterprise.com with the same email address in, say, the gmail domain e.g. xx@gmail.com. It is appreciated that data and/or relationships between data (e.g. between fields in various tables in a data set) may be edited. And/or the designer may decide to disconnect any given relationship between two tables or to connect any two tables found by the dataset designer to be unconnected. Perhaps, for example, a dataset designer may view the data and conclude that a "birthdate" column should be associated with an "age" column and/or re-labelled "birthdate" rather than just "date", so that, when dummy data is being generated, a customer record will not be erroneously generated in which the dummy customer is 60 years old, yet has a birthdate of one year ago. Or, perhaps a field or column which was understood to represent "integers" would be replaced to read "customer ages" to prevent dummy customer records being generated in which a customer is, say, 217 years old. So, typically, data structure is not merely mirrored after the data structure has been copied by the main server, and instead, the data structure may be modified or extended.

The user interface that the designer uses to edit his dataset definition may for example be similar to ERD tool interfaces, such as the interface of Toad, however typically some or all of the following differences distinguish the user interface herein, from that of ERD tools:

1. It is not an ERD tool that imposes hard limitations on the data structure and relationships.
2. The UI herein is built for data definitions rather than mainly for data structure as in the case of Toad.
3. Some validations may be performed when the enterprise user initiates generation workflow, to render the system less intrusive.
4. The UI may allow dataset generation from sources other than RDBMS such as but not limited to CSV, WSDL/Swagger.
5. The UI is more rule/business demand oriented than a pure data physical structure.

It is appreciated that dataset editing serves inter alia enterprises who seek to whiten or anonymize their data, as well as enterprises who wish to edit their datasets for other reasons.

Typically, the human designer (end-user of the platform shown and described herein) stipulates that editing has been completed e.g. by pressing a "generate dataset" virtual button displayed in the user interface generated by the main server. Then, typically, the main server conducts suitable validation operations e.g. to determine whether the dataset definition is internally consistent and logical. Typically, the main server forces the human designer to correct any problems identified by the main server's validation check.

According to certain embodiments, a particular feature of the validation process is that an enterprise user is prevented from creating or generating non-logical (e.g. which negate common sense) relationships among different tables. For example, typically, if he/she creates a relationship, both sides of the relationship e.g. both tables, must contain the same type of data and in the same order. Uncorrelated table columns typically cannot be used in a relationship, for example, Table A's email field cannot be connected to Table B's birthdate field as these two fields are of different types and/or different rules apply thereto.

Main server has dataset generator functionality which generates a dataset in accordance with the dataset definition (aka dataset metadata) developed in the above operations 2, 3, typically in background. Typically, dataset generation proceeds in accordance with any subset of or all of the following inputs: the dataset definition approved by the end user in operation 3 above, a set of rules some or all of which may be global for all enterprises including, typically, dependencies between those rules. Any suitable dependencies between rules may be provided, such as, say:

If Table A contains address, city and zip code fields they must all correspond to the same geographical location, about which the system has pre-loaded knowledge. For examples, if address is "23 First Ave" and city is "New York", the zip code must e of that address in that city, and not, say, of "23 First Ave" in Los Angeles.

Operation 4. Original data aka source dataset (for use cases in which the enterprise provided n original data records and the main server is being tasked with expanding the size of this original dataset to N>n records), dictionaries, and algorithms. Typically, the main server has access to a repository of dictionaries each of which has an ID which (if expressed in natural language) may include, say universities, cities, last names, corporations, countries, Internet domains, months, and so forth. Typically, some or almost all of the rules instruct the main server to access certain of these dictionaries. For example, the rule for generating "first name" fields may stipulate inter alia, that a "girls' names" dictionary should be accessed if the gender field is female, whereas a "boys' names" dictionary should be accessed if the gender field is male.

Typically, each rule is stored in memory in association with a particular field, such as, say, organization name, salary, job position.

According to certain embodiments, textual (aka String based) rules may have only a max length attribute, as the min length can be 0 only.

According to certain embodiments, numeric or temporal based rules (those whose parent rules are Long, Float, Date, Datetime) always have min and max value attributes.

Typically, algorithms include numerical algorithms and textual algorithms and these, like the dictionaries, may also be invoked by the rules. Typically, source datasets are parsed or partitioned into 2 dataset portions—one numerical and the other textual. The numerical algorithms and textual algorithms are then applied to the two portions respectively. For example, the numerical algorithms may include a suitable algorithm for determining whether there are time series in the numerical portion of the source dataset, such as a sequence of time-stamped sensor readings where each such reading may include a data and/or time and an associated numerical value read by the sensor at that date and/or time. The numerical algorithms may also include an algorithm for discerning patterns in each detected time series e.g. the temporal interval between adjacent readings.

Any suitable algorithm/s may be used for numeric data analysis/generation such as but not limited to recurrent neural network (RNN)-based or Gaussian mixture models (GMM)-based algorithms.

Any suitable algorithm/s may be used for textual data analysis/generation such as but not limited to neural network based algorithms e.g. Word2Vec, part-of-speech tagging, tokenization, lemmatization, name-entity recognition (NER), in conjunction with dictionaries (e.g. of country names, city names, university names, male first names, last names, and so forth) and conventional NLP processing routines.

Any suitable time series analysis technology may be employed, such as Long short-term memory (LSTM), an example of a recurrent neural network (RNN) architecture; RNNs allow forward and backward connections between neurons. LTSM remembers values over arbitrary intervals and stored values are not modified as learning proceeds. LSTM is operative to classify, process and predict time series even when size of time lags between events is unknown.

Alternatively or in addition, the numerical algorithms may include algorithm/s for grouping the data in the numerical portion of the source dataset e.g. a suitable cluster analysis algorithm such as but not limited to Gaussian mixture models aka GMM, which assigns some or all of the data in the numerical portion of the source dataset into groups. For example, when analyzing records of humans including credit card transactions performed by each, the main server may determine e.g. by cluster analysis, that retirees generate less transactions than young male humans who generate less transactions than young female humans. Typically, once the groups and their differentiating characteristics have been identified, the main server ensures that these groups continue to exist in the artificially generated dataset. For example, if the original dataset included 10% retirees with a certain distribution of transactions (e.g. on average T transactions per month with a standard deviation S), plus 25% young females and 23% young males each with their own, different distribution of transactions, the main server ensures that these groups continue to exist in the artificially generated dataset e.g. by generating data records of which about 10% are retirees, 25% young females and 23% young males (by defining age and gender fields suitably) and in each of these three groups, the transactions may be artificially generated to have the same average and standard deviation found respectively for that group in the original dataset.

Any suitable textual algorithms may be employed e.g. conventional NLP (natural language processing) algorithms. Variants of regular expressions aka regexes may be employed to process natural language text, e.g. to identify a single text which has different variants such as "color" vs. "colour", using suitable methods such as a fuzzy string matching algorithm. Regexes aka regular expressions may be used for text processing specifically (and for string processing generally).

If the system cannot find any rule that applies to a particular field, and does not know the field's data type, and only knows that the content of this field is a string, the system may suggest that this field's rule is String. However, the UI typically allows the enterprise user to correct DM extraction results.

Operation 5. Deploy dataset: In this operation, the dataset as generated is installed e.g. uploaded into a proof-of-concept environment; if several such proof-of-concept environments are available, the user interface may prompt the end-user to select one.

Any proof-of-concept environment may be employed e.g. as described in co-pending published U.S. patent application Ser. No. 15/347,191 to Sapozhnikov and Olshanetsky, published as 20170139816 and entitled "Computerized Method And End-To-End "Pilot As A Service" System For Controlling Start-Up/Enterprise Interactions".

For example, the proof-of-concept environment may include any or all of the components and functionalities possessed by any of the software testing environments described in published United States Patent Application 20170139816. Each such POC environment may include servers, data repositories, computer programs and security functionality useful for running a proof-of-concept to test one or several software products all intended to serve a given enterprise. Any suitable technology may be employed to deploy/install/upload the dataset e.g. importation of csv files into a suitable supported database instance such as oracle, Microsoft SQL Server, MySQL, PostgreSQL, Cassandra.

It is appreciated that the operations above may be used for example by a processor configured to simulate an enterprise's servers and/or API's and/or data. It is appreciated that according to certain embodiments, plural enterprise simulating servers each generated as described herein, are deployed in a single integration environment (e.g. as described above with reference to the API generation workflow, and/or data repositories generated as described herein to simulate enterprise secret data repositories, are also deployed in the integration environment. For example, an enterprise user may select a target pilot environment in the platform shown and described herein and may create in that environment a DBMS instance by providing relevant information e.g. as prompted by a suitable user interface. That RDBMS instance may be attached to the environment that enterprise user has just created, by the platform server. Then the enterprise user may initiate a deployment workflow e.g. as described herein, which is given the target environment and database credentials parameters as input. The deployment workflow then deploys the generated dataset in that DB instance. Artificial data, generated as described herein to simulate enterprise data is then loaded into the installed data repository/ies.

Typically, the enterprise user is allowed, by the system, to impose per table column/field masking that has different implications per each rule.

For example, if the enterprise user selects to mask corporate emails, the system may generate other domain based emails.

According to certain embodiments, if the system fails to detect a rule provided by a specific enterprise end-user (or if the rule provided is incorrect), the system is configured to fall back to, or resort to, one of the enterprise's default (aka "parent") rules, such as rules stored in the system for each of several types of fields respectively, e.g. for each of Long, Float, String, Date, Datetime. Each such rule may have one or more child rules to which the enterprise user can switch in the DM UI.

Any suitable hierarchy of rules may be employed. For example, the enterprise user may switch only among same-parent type rules. For example, if a Table A contains a (String based) email field, this field cannot be changed aka switched to an "account number" field, e.g. because the (String based) email field is a child rule of its parent Long rule.

Any suitable method may be employed to generate a relationship, in the data structure, between two unrelated files received from a certain enterprise (such as the enterprise's customer-file and inventory-file listing various products distributed by the enterprise). For example, the main server may generate a data set in which each customer is associated with (perhaps to represent a situation in which each customer, in real life, orders) certain inventory products, say 10 products per male and 100 per female.

A relationship between Customers and Orders table can be made, for example, by including a customer_id field in both tables. In addition to selecting the fields connecting these two tables, the enterprise user may then be required to provide cardinality of the relationship, thus for example specifying how many Orders records may be connected to a single Customer record. Rules or at least parent rules on both side of the relationship are typically required to fit. For example, typically, each field in each table is governed by a rule. If Table A has a field whose governing rule is String, and table B has a field whose governing rule is Email, these 2 tables can be connected via a relationship, if String is a parent rule of the Email rule (since an email may be regarded by the system as a special case of the more general "string" case). Typically, a side effect of such a relationship, once generated, is that the String relationship side (Table A) gets data similar to Email rule based data generated in Table B.

Reference is now made to FIG. 3.

Typically, an API is generated, e.g. as shown in FIG. 3, by the main server which is configured for generating an application, conforming to information, provided to the main server by an enterprise E about a proposed pilot P. So, typically, each time an enterprise provides such information, preparatory to that enterprise's next pilot, the main server generates (code for) at least one API for that enterprise and that pilot. The information (aka information source) includes (or from the information source there can be derived, by the main server), a description sufficient to generate application/s that can be employed as APIs that will enable pilot P to be run on behalf of enterprise E by one or more startups S. Such an application or applications may then be installed on one or more application server/s (virtual machine/s) dedicated to or assigned to pilot P to which one or plural startups may connect, and then run their software which is participating in pilot P. It is appreciated that each participating startup in pilot P may have a separate application server dedicated thereto, or, alternatively, one application server assigned to pilot P may serve plural startups participating in pilot P.

Any suitable information source may be provided by enterprise E to the main server. For example, one enterprise may provide a Swagger file, another may provide a WSDL file, and a third enterprise E3 may simply give the main server partial or unlimited access to the E3 data repository. The information or specification in the swagger file or WSDL file is then used by the main server to generate applications that will serve as APIs for the first and second enterprises' pilots (proof-of-concepts) respectively. In the case of enterprise E3, the main server derives from the E3 data repository, a description or specification sufficient to generate application/s that can be employed as APIs that will enable the pilot in question to be run on behalf of enterprise E3 by one or more startups.

In the case of the first and second enterprises, the main server, responsive to provision of a swagger or WSDL file, respectively typically generates not only an API as described above (in fact swagger or WSDL may result in generation of plural APIs), but also other layers. Typically, the main server generates resources to serve as a REST endpoint, then, behind the resources, the main server generates business logic and behind that, the main server generates a data access layer.

In the case of the third enterprises, the main server having accessed E3's data repository, generates a data access level, then a business logic level and then a REST endpoint, in accordance with data structure and relationships discovered by virtue of the main server's access to the E3 data repository.

Any suitable method may be performed by the system to derive a description from DB (for enterprise E3), typically including access of DB then generating a data access level, then a business logic level, and then a REST endpoint.

The module that performs this typically connects to a DB, learns its structure, and creates a data access layer according to the database structure, typically using a suitable object-relational mapping (ORM) framework, such as but not limited to Hibernate, EclipseLink, OpenJpa, EntityFramework, SQLAlchemy, which may optionally be customized for certain specific use cases.

Once an API and data have been generated for an enterprise E's pilot (or POC) p, e.g. as described above, typically on a server (virtual machine) which has been assigned to that pilot, a secure channel is typically generated between each startup and the relevant application server via the relevant API or APIs. For example, a channel may be generated if the two nodes or sides to be interconnected (platform shown and described herein on the one hand, and enterprise and/or startup on the other hand) share a common secret session key that is then used to encrypt data sent over the channel. The nodes may for example belong to a conventional PKI ecosystem which allows the session key to be securely established. And/or, any of the teachings on channel generation in co-pending U.S. patent application Ser. No. 15/347,191 to Sapozhnikov and Olshanetsky, published as 20170139816 and entitled "Computerized Method And End-To-End "Pilot As A Service" System For Controlling Start-Up/Enterprise Interactions", may be employed.

Once each secure channel to enterprise E's pilot p is up, a relevant startup e.g. which has enlisted and been accepted to pilot p e.g. via the platform described in applicant's co-pending U.S. patent application Ser. No. 15/347,191, is provided with connection particulars enabling it to connect via the secure channel, and the startup can then run its software and be evaluated by the enterprise for the pilot.

FIG. 3 illustrates a method for simulating an enterprise's API. The method of FIG. 3 typically includes some or all of the following operations, suitably ordered, e.g. as follows (or may include some or all of the API generation workflow described above):

Operation 301. A user e.g. enterprise provides suitable input data from which enterprise API may be derived e.g. uploads a Swagger or WSDL file, and/or grants access to an RDBMS of the enterprise Operation 302. The system analyses the input data provided in operation 301 and accordingly, generates server code based on API definitions detected in the uploaded file or DB schema contents available by virtue of each server's access to the enterprise e.g. via RDBMS Operation 303. The server code generated in operation 302 may be wrapped in a suitable framework code aka Deep Mirroring framework code and compiled A set of code templates may be created or generated separately for each of plural use cases such as Swagger, WSDL, database use cases described herein. Each template may be based on a pre-prepared server-side framework, including base DB entities, validations, errors and error messages, basic data access layer code, basic business layer code, and common configuration code.

Operation 304. The compiled API server code is then packaged in a suitable file format e.g. as a WAR (Web Application Resource or Web application ARchive) file although this is not intended to be limiting, and, alternatively, any other suitable file format may be employed such as but not limited to, say, EAR, JAR, EXE or ELF (Executable and Linkable Format). The WAR file may comprise a JAR file used to distribute JavaServer Pages, Java Servlets or classes, XML files, tag libraries, static web pages e.g. HTML and/or related files, and/or other resources; these in combination constitute a web application. The WAR file may, if desired, be digitally signed so others can ascertain where the source code came from. The WAR file may include some or all of the following files and directories: /WEB-INF directory which may include a web.xml file which defines the structure of the web application. If the web application uses servlets, the servlet container may use the web.xml file to determine which servlet a URL request is to be routed to. The web.xml file may also define context variables which can be referenced within servlets and/or may define environmental dependencies for the deployer to set up. The WAR file may facilitate testing and/or deployment of web applications and/or identification of a version of a deployed application. Properties files may be used to identify environment specific variables. An external properties file may define a link and the source code may read the property file to determine a target LDAP server, ensuring that a WAR file promoted to production is that which was tested and/or verified.

Operation 305. A new virtual machine (e.g. Linux based virtual machine with preinstalled application server, for example Apache Tomcat, or Apache TomEE, or it can be JBoss Application Server, or Jboss Wildfly) is started for the Application server where the generated code is to be deployed Operation 306. The *war file is deployed into the virtual machine. Typically, the WAR file is deployed/copied into the predefined directory managed by the application server. The application server, when started, typically constantly checks the directory and when the application server detects that a new file (the WAR file e.g.), is copied into the directory, the server, responsively, starts or trigger's the application's deployment into itself (into the application server).

Operation 307. Access e.g. of a startup participating in an enterprise's pilot, and/or of the enterprise itself, to the running server code is granted via a suitable access channel provided by the system e.g. in co-pending U.S. Ser. No. 15/347,191.

FIG. 4 illustrates a method for generating KPIs for an enterprise. The method of FIG. 4 typically includes some or all of the following operations, suitably ordered, e.g. as follows:

Operation 401. Provide an external resource (e.g. via URL or RDBMS credentials+SELECT command) e.g. in accordance with the method of FIG. 9.

Operation 402. A container with wrapper code generated in operation 401 is deployed into a cloud environment of the platform shown and described herein. an AWS Lambda service or: Google Cloud Functions or Microsoft Azure Functions or IBM Blumix OpenWhisk Container may for example be used.

Operation 403. A test to validate the container code may be run e.g. to verify correctness of the uploaded code and/or to verify ability to use the uploaded code either as a business KPI or as part of a formula to compute a business KPI. The code may be wrapped in a cloud based container (such as but not limited to AWS Lambda, Google Cloud Functions or Microsoft Azure Functions or IBM Blumix OpenWhis), the input and output parameters are known as described herein; hence the input parameter values are provided, a container (e.g. AWS Lambda, Google Cloud Functions or Microsoft Azure Functions or IBM Blumix OpenWhis) is called up, and the expected result is verified with the response value actually received.

The method of FIG. 9 (which may be used standalone or to implement operation 401 of FIG. 5) typically includes some or all of the following operations, suitably ordered, e.g. as follows:

Operation 401.1 If a link to an external URL is provided the deep mirroring platform generates a wrapper code that is deployed into a container.

Operation 401.2 If RDBMS credentials and SELECT command are provided, a deep mirroring platform may be used to generate a wrapper code that is deployed into a container. Typically, provided credentials and SQL SELECT command are wrapped in the execution code and deployed into a container (e.g. AWS Lambda, Google Cloud Functions or Microsoft Azure Functions or IBM Blumix OpenWhis).

Operation 401.3 If a Javascript or Python code operative to compute a KPI value is uploaded into the platform shown and described herein, that code may be wrapped in SQL executing code and deployed into a container.

Typically, the containerized code returns a numeric value which may be used either as a standalone/separate business KPI, or as a variable in a business KPI formula which may be complex.

Reference is now made to FIG. 5 which is a simplified flowchart of an example method for performing operation 2 of FIG. 2; the method may also be used as standalone rather than in conjunction with the remaining operations of FIG. 2. The method of FIG. 5 typically includes some or all of the following operations, suitably ordered, e.g. as follows:

Operation 2.1 Understand data type. Typically, a tree of data types is provided, which may include parent data types such as some or all of the following:

1. Long 2. Float 3. String 4. Date 5. Datetime 6. Enum (enumeration).

Then each parent type may have one or more children, aka sub types, such as but not limited to:

Long subtypes: passport, credit card, age.

Float subtype: salary

String subtypes: birth place, country, email address, first name, last name, IP address, nickname, URL Date subtype: birth date Datetime subtype: time Enum subtype: gender The above may be stored as a table or hierarchy or list of rules indicating, inter alia, which data type is a son/child of which.

Operation 2.2 Analyze data (typically, data is treated in columnar based representation).

Operation 2.3 Load the analysis results from operation 2.2 into a suitable database aka DeepMirroring database (model), as a dataset.

Typically, the Deep mirroring database contains the following data hierarchy, per dataset structure:

Dataset->table->column->column rule->column rule attributes.

Regarding operation 2.2, to identify each field in each table, typically, stages or phases are pre-defined typically including the order in which the stages are to be performed and/or a weight given to each stage The order of modules invoked to detect rules may for example comprise the following, from first to last:

1. Regular expressions
2. Name entity recognition
3. Dictionary based recognition
4. NLP based recognition (typically includes entire NLP flow)
5. Simple column name based recognition For example, the order may be first to look at the heading of the currently processed field in the currently processed table, then to perform NLP, then to perform regular expression analysis, then to resort to dictionaries. Each stage is performed and yields an interim output and a final output, and is then determined by weighting the interim outputs. For example, a particular field may be thought to store email addresses when the regular expression stage is performed, however the interim output of the NLP stage indicates this field's contents are first names. If the NLP stage is higher weighted than the regular expression stage, the field will be deemed to store first names. One method for performing operation 2.2. includes some or all of the operations illustrated in FIG. 6.

Regarding operation 2.3, a Deep Learning model may be used to construct a "neural network" with input and output layers and hidden layers in between. This can then be trained to perform tasks by using knowledge from previously solved tasks such as learning structural design of sample data or original data provided at least in part (e.g. just metadata not contents) by an enterprise. Tasks that the trained set can perform may for example include generating artificial data which resembles or simulates the sample data; this process of generating similar data is termed herein mirroring or deep mirroring. Typically, an assumption is made that the original data is generated from an (unknown) probability distribution $latex \Phi$ and independence of this data is assumed: $latex \Phi(x)=\Phi(x\_1)\Phi(x\_2) \ldots \Phi(x\_m)=\prod\_{i=1}^{m}\Phi(x\_i)$ This is called the Likelihood function. The unknown distribution may then be modelled e.g. by assuming a weighted sum $latex \Phi(X)=\prod\_{i=1}^{m}\sum\_{j=1}^{k}w\_jP\_j(x\_i)$ of k simpler, known distributions: $latex \Phi(x\_i)=w\_1 \, P\_1(x\_i)+ \ldots +w\_k \, P\_k(x\_i)=\sum\_{j=1}^{k}w\_jP\_j(x\_i)$. Typically, the main server is operative to compute the initial unknown distribution by computing a $latex w\_j$, $latex P\_j$ that maximizes $latex \Phi (X)$. Then, mirroring can be achieved by generating new, artificial samples according to that distribution.

Any suitable method, including trial-and-error, may be employed to find parameters that maximize the likelihood, for example, the same code/logic may be run over plural datasets (e.g. several dozen CSV files) in order to arrive at suitably fitting parameter values.

A particular advantage of this embodiment is that generating nearly exact replicas of an original data set results in a more data rich POC testing environment, relative to situations common in the field, in which little or no data is available to an enterprise to use for POC testing, e.g. due to data-breach concerns or simply because the enterprise has thus far accumulated only a small amount of genuine (as opposed to artificial) data records.

FIG. 6 is a simplified flowchart of an example method for performing operation 2.2. of FIG. 5; the method may also be used standalone rather than in conjunction with the remaining operations of FIG. 5. The method of FIG. 6 typically includes some or all of the following operations, suitably ordered, e.g. as follows:

Operation 2.2: detect a data element type via metadata available from the provided data, if any.

Operation 2.2.2: run NLP analysis flow (including linguistic data analysis, using internally compiled dictionaries) where applicable. It is appreciated that any suitable set of NLP tools or textual analysis algorithm/s may be run for each table and field and file, and even for each name of each field (typically after first parsing to partition strings including multiple words, into the component words—such as partitioning FIRSTNAME into "first" and "name").

Operation 2.2.3: run rules and related logic to understand the data by applying regular expressions and scripts defined for some rules, typically less than all rules. For example regular expressions and scripts may be defined for a Rule governing a URL field. Typically, correctness of URL cannot simply be verified by a regular expression because the regular expression would be so complex that its execution might take an unacceptably long amount of time. Instead, an alternative solution may be provided e.g. Groovy script that relies on Java standard libraries to perform a suitable check of the URL.

Operation 2.2.4: As per every column in the initial data, run operations 2.2.1-2.2.3 and get weights as a result of every analysis phase, compute a rule e.g. the best fitting rule that can be detected. For example, a Simple Decision Tree that traverses these weights and selects the highest one may be employed, taking in account the importance of each weight relative to other weights.

FIG. 7 is a simplified flowchart of an example method for performing operation 4 of FIG. 2; the method may also be used standalone rather than in conjunction with the remaining operations of FIG. 2. The method of FIG. 7 typically includes some or all of the following operations, suitably ordered, e.g. as follows:

Operation 4.1: split originally uploaded dataset into numeric and textual portions e.g. as per dataset element aka entity Operation 4.2: generate the target dataset metadata.json e.g. a snapshot of the dataset to generate including rules and limitations Operation 4.3: run generation of numeric and textual portions typically in parallel Operation 4.4: join the numeric and textual portions generated in operation 4.3, into the original data representation Operation 4.5: if relationship limitations are provided by the customer aka enterprise, apply the relationship limitations to the joined data generated in operation 4.4

Operation 4.6: typically, an archive of the generated data is prepared in advance for future download since size considerations may make downloading online upon user request impractical FIG. 8 is a simplified flowchart of an example method for performing operation 5 of FIG. 2; the method may also be used standalone rather than in conjunction with the remaining operations of FIG. 2. The method of FIG. 8 typically includes some or all of the following operations, suitably ordered, e.g. as follows:

Operation 5.1: the target database is created and initiated

Operation 5.2: generate business KPI candidates, as per the target pilot to which environment the dataset is being deployed. For that purpose, according to some embodiments, some or typically all of the following information must be analyzed: pilot name, pilot details, pilot instructions, pilot evaluation criterion, pilot category name, as well as numeric columns of the pilot database since access to numeric data is typically measured (may be added to the measurement formulas). According to some embodiments, natural language analysis must be performed and a subset of fields e.g. 2-5 fields in different tables may be selected as being of possible interest to an enterprise running the pilot. KPIs of interest, e.g. as confirmed by the enterprise, are then measured during the pilot.

Typically, NLP algorithms are employed for the natural language analysis, such as but not limited to part-of-speech tagging, tokenization, lemmatization, word2vec. Linguistic dictionaries, such as but not limited to WordNet or Wiktionary, may be used for linguistic data processing.

Operation 5.3: generate the target database structure based on the dataset metadata (aka dataset DDL generation)

Operation 5.4: load the generated dataset into the target database generated in operation 5.1

Operation 5.5: inform enterprise of dataset availability

Many variations are possible. For example, the platform as described herein uses neural net algorithms such as:

LSTM—to detect if the enterprise data contains time series.

GMM—to find clusters of numeric data.

Word2Vec—to construct the matrix of words and their interdependencies in a pilot description, metadata, categories, etc.

However alternatively, other algorithms (neural net or alternatives) may be employed for any of the above purposes.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order, any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order, electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true, and never by determinations that x is false.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A system comprising:
a platform configured for communicating with enterprise end-users and for allowing the enterprise end-users to perform proof-of-concept (POC) testing for startups which provide respective enterprises with software products to be evaluated by the respective enterprises, the platform including processor functionality configured to:
analyze available information on enterprise application program interfaces (APIs) and, accordingly, generate metadata characterizing the enterprise APIs;
generate at least one artificial API, the at least one artificial API aka "regenerated simulated smart API" conforming to that metadata; and
provide to at least one enterprise, access via a channel to a pilot environment aka POC testing cloud environment which is representative of the enterprise's production environment including at least said regenerated simulated smart API.

2. The system of claim 1, wherein at least one of the enterprise end-users provides input data from which least one artificial API is derived.

3. The system of claim 2, wherein said input data includes at least one uploaded file storing an automatically generated API description.

4. The system of claim 3, wherein said uploaded file comprises a Swagger file.

5. The system of claim 3, wherein said uploaded file comprises a WSDL file.

6. The system of claim 2, wherein at least one of the enterprise end-users provides said input data by granting, to the platform, access to an RDBMS of the enterprise.

7. The system of claim 2, wherein said platform analyses said input data and accordingly, generates server code based on API definitions detected in the uploaded file.

8. The system of claim 2, wherein said platform analyses said input data and accordingly, at least once generates server code based on DB schema contents available by virtue of server access to at least one enterprise.

9. The system of claim 8, wherein said server code is wrapped in framework code and compiled, thereby to provide compiled API server code.

10. The system of claim 9, wherein said compiled API server code is packaged as a file, using WAR (Web Application Resource) file format, thereby to generate a WAR file.

11. The system of claim 9, wherein said compiled API server code is packaged as a file, using Web application Archive file format.

12. The system of claim 9, wherein a new virtual machine, including at least one Application server, is started, and the API server code as generated is deployed in the Application server.

13. The system of claim 12, wherein the virtual machine comprises a Linux based virtual machine with a preinstalled application server.

14. The system of claim 12, wherein the application server, once started, checks the directory and when the application server detects that a new file is deployed into the directory, the application server, responsively, triggers the application's deployment into said application server.

15. The system of claim 9, wherein said compiled API server code, packaged as a WAR file, is deployed into the virtual machine by deploying the WAR file into a predefined directory managed by the application server.

16. The system of claim 2, wherein access, of at least one platform end user, to running server code of the at least one artificial API, is granted via an access channel provided by the system.

17. The system of claim 16, wherein said at least one end user to whom said access is granted, includes at least one startup end-user participating in the at least one enterprise's pilot.

18. The system of claim 16, wherein said at least one end user to whom said access is granted, includes the enterprise itself.

19. The system of claim 1, wherein a framework code is generated and subsequently repeatedly re-used, in order to provide common functionality for plural generated codes including plural system layers.

20. The system of claim 1, wherein said plural system layers include at least one of data access layer, business logic layer, error and validation handling libraries.

* * * * *